United States Patent
Srivastava et al.

(10) Patent No.: US 12,493,091 B1
(45) Date of Patent: Dec. 9, 2025

(54) SUPPRESSING IMAGE ARTIFACT WITH RF PULSE PHASE IN MULTI-SHOT SS-FSE SEQUENCE

(71) Applicant: Hyperfine, Inc., Guilford, CT (US)

(72) Inventors: Deepansh Srivastava, Guilford, CT (US); Laura Sacolick, Guilford, CT (US)

(73) Assignee: Hyperfine, Inc., Guilford, CT (US)

( * ) Notice: Subject to any disclaimer, the term of this patent is extended or adjusted under 35 U.S.C. 154(b) by 0 days.

(21) Appl. No.: 18/326,464

(22) Filed: May 31, 2023

Related U.S. Application Data

(60) Provisional application No. 63/489,950, filed on Mar. 13, 2023.

(51) Int. Cl.
*G01R 33/56* (2006.01)
*G01R 33/48* (2006.01)
*G01R 33/561* (2006.01)

(52) U.S. Cl.
CPC ..... *G01R 33/5608* (2013.01); *G01R 33/4818* (2013.01); *G01R 33/561* (2013.01)

(58) Field of Classification Search
CPC ............ G01R 33/4818; G01R 33/5608; G01R 33/561
See application file for complete search history.

(56) References Cited

U.S. PATENT DOCUMENTS

| | | | |
|---|---|---|---|
| 10,241,172 B2* | 3/2019 | Ganssle | G01V 3/32 |
| 10,557,906 B2* | 2/2020 | Chen | G01R 33/50 |
| 2005/0248347 A1 | 11/2005 | Damadian | |
| 2010/0283463 A1* | 11/2010 | Lu | G01R 33/243 |
| | | | 324/309 |
| 2015/0005618 A1 | 1/2015 | Dumoulin | |
| 2015/0226817 A1 | 8/2015 | Pourrahimi | |
| 2020/0355761 A1 | 11/2020 | Mcnulty et al. | |
| 2021/0278493 A1* | 9/2021 | Kondo | G01R 33/56554 |
| 2022/0354378 A1 | 11/2022 | Nacev et al. | |
| 2024/0168105 A1 | 5/2024 | Inglis et al. | |

* cited by examiner

*Primary Examiner* — Gregory H Curran
(74) *Attorney, Agent, or Firm* — Foley & Lardner LLP

(57) ABSTRACT

Systems and methods for suppressing image artifacts in multi-shot magnetic resonance (MR) images are disclosed. The techniques described herein include initiating a pulse train for a segment of a multi-shot fast spin-echo imaging procedure by applying an excitation radio frequency (RF) pulse, and transmitting a plurality of RF refocusing pulses for the segment. Each refocusing pulse of the plurality of RF refocusing pulses may have a respective phase that increases by a predetermined phase offset with each successive refocusing pulse of the segment. The techniques include generating k-space data based on a respective plurality of echoes detected by the MR system in response to the plurality of RF refocusing pulses.

15 Claims, 11 Drawing Sheets

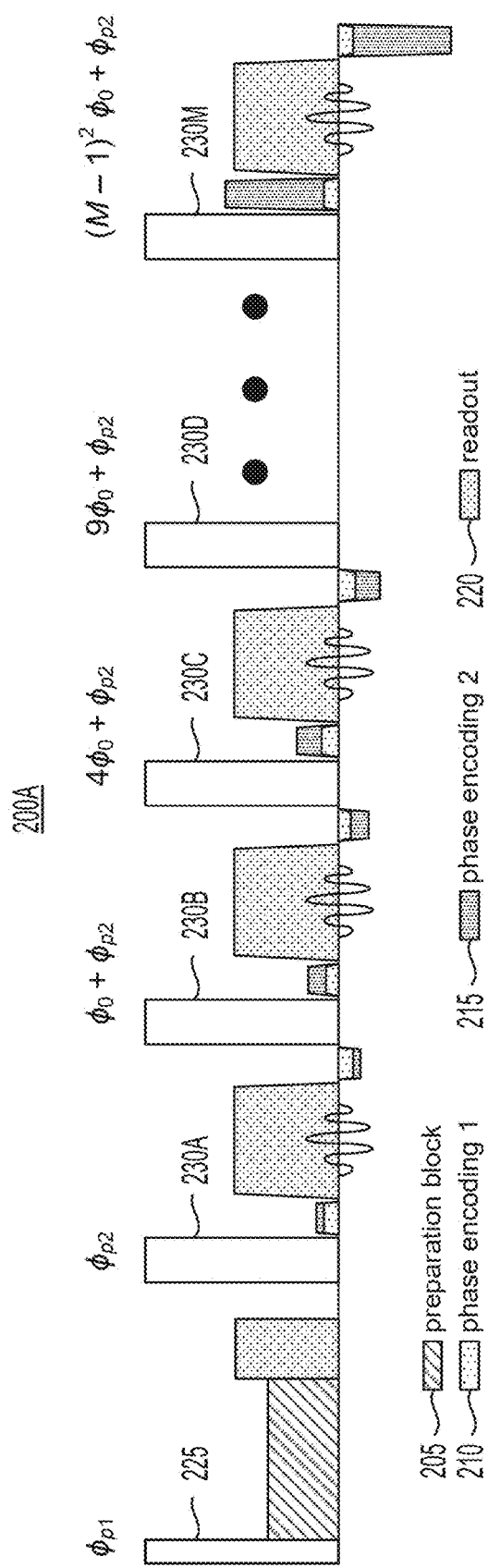
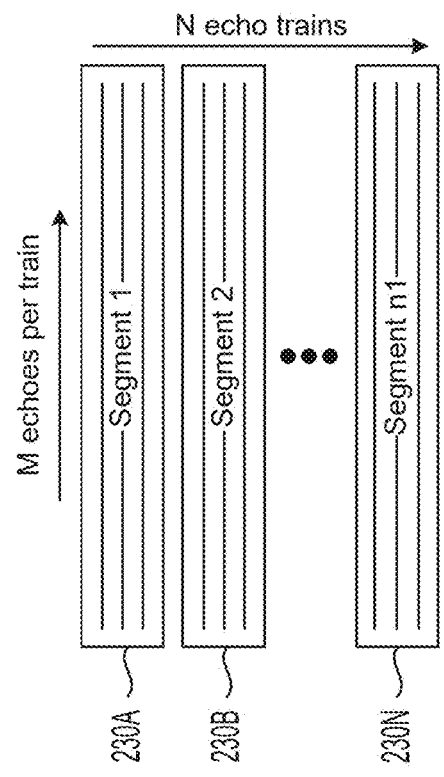
FIG. 2A
FIG. 2B

SUPPRESSING IMAGE ARTIFACT WITH RF PULSE PHASE IN MULTI-SHOT SS-FSE SEQUENCE

CROSS-REFERENCE TO RELATED APPLICATIONS

The present application claims the benefit of and priority to U.S. Provisional Application No. 63/489,950, filed Mar. 13, 2023, the content of which is incorporated by reference herein in its entirety for all purposes.

FIELD OF THE DISCLOSURE

The present invention relates generally to the field of multi-shot magnetic resonance (MR) imaging, and in particular, multi-shot fast spin echo (FSE) imaging.

BACKGROUND

Magnet resonance imaging (MRI) systems may be utilized to generate images of the inside of the human body. MRI systems may be used to detect magnetic resonance (MR) signals in response to applied electromagnetic fields. MRI techniques may include FSE imaging, in which a series of radio frequency (RF) pulses are used to excite the protons in tissues. FSE imaging techniques are used to construct images from multiple echoes, which are generated by refocusing the magnetization of the excited protons, to increase the speed of image acquisition. However, FSE is challenging to implement in low-field MR systems, resulting in artifacts such as eddy current artifacts and ghosting artifacts, which impacts image quality.

SUMMARY

The systems and methods of this technical solution provide techniques for suppressing image artifacts in multi-shot FSE imaging by introducing additional phase shifts in the RF pulses used to excite and refocuse protons in tissues. By utilizing the techniques described herein, image artifacts can be suppressed within a single transient by simultaneously varying the RF pulse phase along with the gradient encoding phase throughout the multi-shot FSE trains. The RF pulse phase can be varied to cycle pulse phase within smaller chunks of k-space data, where the variation in the gradient encoding phase is minimal, rather than the entire k-space. By utilizing these techniques, the k-space data captured using FSE trains can suppress image artifacts at both high and low-field MRI scanners with low $B_0$ homogeneity, where the $^1$H Nuclear Magnetic Resonance (NMR) signal linewidth may be as large as 900 ppm, and low $B_1$ inhomogenity, where $^1$H Nuclear Magnetic Resonance (NMR) RF pulse refocusing angles may range from 120-180 deg, in a non-limiting example.

At least one aspect of the present disclosure is directed to a method of suppressing image artifacts in multi-shot MR images. The method may be performed by an MR system including one or more processors. The method includes initiating a pulse train for a segment of a multi-shot fast spin-echo imaging procedure by applying an excitation RF pulse. The method includes transmitting a plurality of RF refocusing pulses for the segment. Each refocusing pulse of the plurality of RF refocusing pulses has a respective phase that increases by a predetermined phase offset with each successive refocusing pulse of the segment. The method includes generating k-space data based on a respective plurality of echoes detected by the MR system in response to the plurality of RF refocusing pulses.

In some implementations, the method includes initiating a second pulse train for a second segment of the multi-shot fast spin-echo imaging procedure by applying a second excitation RF pulse having a second initial phase offset. In some implementations, the second initial phase offset may be equal to a first initial phase offset of the excitation RF pulse plus a predetermined phase increment. In some implementations, the predetermined phase increment is about equal to $2\pi$ divided by a number of shots to be captured for the multi-shot fast spin-echo imaging procedure. In some implementations, a number of RF excitation pulse phase steps ranges from two to a number of pulse trains in the sequence divided by two.

In some implementations, generating the k-space data may include applying a readout gradient following a respective refocusing pulse of the plurality of RF refocusing pulses. In some implementations, the k-space data is three-dimensional (3D) k-space data, a respective readout resulting from the respective refocusing pulse corresponds to a first dimension, and the method includes applying at least two phase-encoding gradients respectively corresponding to second and third dimensions. In some implementations, the MR system has a magnetic resonance frequency inhomogeneity greater than 1000 Hz.

At least one other aspect of the present disclosure is directed to a system for suppressing image artifacts in multi-shot MR images. The system includes an MR system comprising one or more processors. The system may initiate a pulse train for a segment of a multi-shot fast spin-echo imaging procedure by applying an excitation RF pulse. The system may transmit a plurality of RF refocusing pulses for the segment. Each refocusing pulse of the plurality of RF refocusing pulses may have a respective phase that increases by a predetermined phase offset with each successive refocusing pulse of the segment. The system may generate k-space data based on a respective plurality of echoes detected by the MR system in response to the plurality of RF refocusing pulses.

In some implementations, the system may initiate a second pulse train for a second segment of the multi-shot fast spin-echo imaging procedure by applying a second excitation RF pulse having a second initial phase offset. In some implementations, the second initial phase offset may be equal to a first initial phase offset of the excitation RF pulse plus a predetermined phase increment. In some implementations, the predetermined phase increment is about equal to $2\pi$ divided by a number of shots to be captured for the multi-shot fast spin-echo imaging procedure. In some implementations, a number of the plurality of RF refocusing pulses ranges from two to a number of pulse trains in the sequence divided by two.

In some implementations, system may generate the k-space data by performing operations comprising applying a readout gradient following a respective refocusing pulse of the plurality of RF refocusing pulses. In some implementations, the k-space data is 3D k-space data, a respective readout resulting from the respective refocusing pulse corresponds to a first dimension, and the system may apply at least two phase-encoding gradients respectively corresponding to second and third dimensions. In some implementations, the method includes the MR system may have a magnetic resonance frequency inhomogeneity greater than 1000 Hz.

Yet another aspect of the present disclosure is directed to another method of producing radio frequency pulses to reduce artifacts in a multi-shot FSE imaging procedure. The method includes transmitting, for each segment of the multi-shot FSE imaging procedure, a plurality of refocusing pulses each with a respective phase that increases by a predetermined phase offset with each successive refocusing pulse.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects may be combined and it will be readily appreciated that features described in the context of one aspect of the present disclosure may be combined with other aspects. Aspects may be implemented in any convenient form. In a non-limiting example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of "a," "an," and "the" include plural referents unless the context clearly dictates otherwise.

BRIEF DESCRIPTION OF THE DRAWINGS

FIG. 2A depicts an example graph showing RF pulses, gradient phase encoding, and echo readouts during a multi-shot FSE sequence implemented utilizing the techniques described herein, in accordance with one or more implementations;

FIG. 2B depicts an example diagram showing how N echo-trains are split into $n_1$ segments, in accordance with one or more implementations;

DETAILED DESCRIPTION

Figure 1:
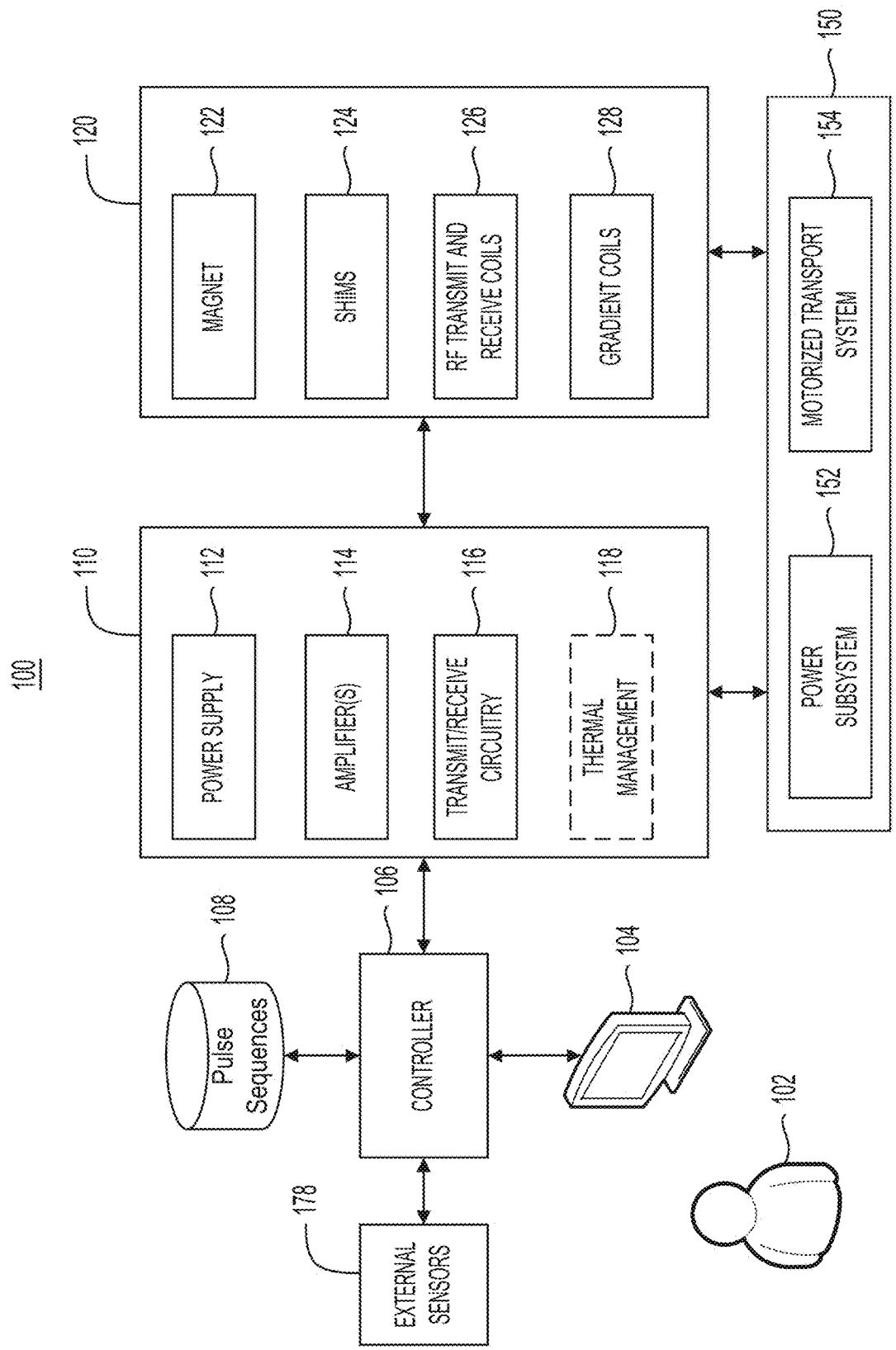
FIG. 1 illustrates example components of a magnetic resonance imaging system, which may be utilized to implement the techniques to suppress artifacts multi-shot FSE imaging, in accordance with one or more implementations.

Below are detailed descriptions of various concepts related to and implementations of techniques, approaches, methods, apparatuses, and systems for suppressing artifacts in multi-shot FSE imaging. The various concepts introduced above and discussed in detail below may be implemented in any of numerous ways, as the described concepts are not limited to any particular manner of implementation. Examples of specific implementations and applications are provided primarily for illustrative purposes.

FSE MR imaging, also known as Fast Spin Echo MRI imaging, is a type of magnetic resonance imaging (MRI) technique that may be utilized in clinical practice. FSE MR imaging works by using a powerful magnetic field and radio waves to produce detailed images of internal structures of a patient. The detailed images may depict aspects of soft tissue that cannot be captured using X-ray imaging machines, and are useful in diagnosing and treating a variety of health conditions.

In FSE MR imaging, a series of radio frequency pulses are used to excite the protons in the tissue of a patient. The protons then emit a signal, which is detected by the MRI machine and used to generate an image. The signals help differentiate tissues, because different protons (e.g., protons in fat vs. protons in water) result in different detectable signals. During a scan, FSE MRI uses multiple echoes, which are generated by refocusing the magnetization of the excited protons, to increase the speed of image acquisition. By acquiring multiple echoes, FSE MRI can create images with higher signal-to-noise ratios and greater contrast between different tissues. One use of FSE MR imaging is to image the brain, spine, and joints, or to identify lesions or abnormalities in soft tissues.

Low-field MRI systems are MR systems that can operate with a lower magnetic field strength than conventional MR systems. Low-field MRI systems may include portable MRI systems, which may have a field strength that may be, in a non-limiting example, less than or equal to 0.5 T. One potential attribute of low-field MR systems used for multi-shot FSE imaging is magnetic field inhomogeneity, which refers to the non-uniformity of the magnetic field strength within the imaging volume. Magnetic field inhomogeneity can cause "artifacts" in images produced from low-field MR systems. Artifacts generally refer to elements that are in an image, but are not present in reality. They may be due to idiosyncrasies of the MR systems or the techniques being used to generate the images. Artifacts may also be due to external factors (e.g., other electronics) that can distort an image. Magnetic field inhomogeneity artifacts may include ghosting, FID artifacts, and eddy current artifacts, among others.

The systems and methods of this technical solution provide techniques for suppressing artifacts in multi-shot FSE imaging, such as artifacts that may occur during scans using low-field MR systems. The techniques described herein can suppress artifacts during acquisition of a single transient. Transients in MR may refer to the number of repetitions or averaging during an MR scan. The techniques described herein are time effective with significantly reduced artifacts. Although aspects of this disclosure are described in connection with low-field MRI, it should be understood that the techniques described herein are efficient for suppressing image artifacts produced by both high and low-field MRI scanners. For example, the techniques described herein may apply to any MR system having low $B_0$ homogeneity, where the $^1$H NMR signal linewidth can be as high as 900 ppm, or inhomogeneity induced by eddy currents.

Although techniques have been proposed that attempt to reduce such artifacts in MR imaging, such alternative techniques require the collection of multiple transients, which adds to the total experiment time. In medical imaging, however, the scan times are critical. When a single transient takes up to minutes to acquire, acquiring multiple transients is not favorable. The techniques described herein provide an efficient RF pulse phase scheme for suppressing signals artifacts in a single transient. The techniques described herein suppress signal artifacts within a single transient by simultaneously varying the RF pulse phase along with the magnetic field gradient encoding phase throughout multi-shot FSE imaging process. The RF pulse phase variations are used to cycle pulse phase within smaller chunks of k-space data rather that the entire k-space.

FIG. 1 illustrates an example MRI system which may be utilized in connection with the artifact suppression techniques described herein. In FIG. 1, MRI system 100 may include a computing device 104, a controller 106, a pulse sequences repository 108, a power management system 110, and magnetics components 120. The MRI system 100 is illustrative, and an MRI system may have one or more other components of any suitable type in addition to or instead of the components illustrated in FIG. 1. Additionally, the implementation of components for a particular MRI system may differ from those described herein. Examples of low-field MRI systems may include portable MRI systems, which may have a field strength that may be, in a non-limiting example, less than or equal to 0.5 T, that may be less than or equal to 0.2 T, that may be within a range from 1 mT to 100 mT, that may be within a range from 50 mT to 0.1 T, that may be within a range of 40 mT to 80 mT, that may be about 64 mT, etc.

The magnetics components 120 may include $B_0$ magnets 122, shims 124, RF transmit and receive coils 126, and gradient coils 128. The $B_0$ magnets 122 may be used to generate a main magnetic field $B_0$. $B_0$ magnets 122 may be any suitable type or combination of magnetics components that may generate a desired main magnetic $B_0$ field. In some embodiments, $B_0$ magnets 122 may be one or more permanent magnets, one or more electromagnets, one or more superconducting magnets, or a hybrid magnet comprising one or more permanent magnets and one or more electromagnets or one or more superconducting magnets. In some embodiments, $B_0$ magnets 122 may be configured to generate a $B_0$ magnetic field having a field strength that may be less than or equal to 0.2 T or within a range from 50 mT to 0.1 T.

In some implementations, the $B_0$ magnets 122 may include a first and second $B_0$ magnet, which may each include permanent magnet blocks arranged in concentric rings about a common center. The first and second $B_0$ magnet may be arranged in a bi-planar configuration such that the imaging region is located between the first and second $B_0$ magnets. In some embodiments, the first and second $B_0$ magnets may each be coupled to and supported by a ferromagnetic yoke configured to capture and direct magnetic flux from the first and second $B_0$ magnets.

The gradient coils 128 may be arranged to provide gradient fields and, in a non-limiting example, may be arranged to generate gradients in the $B_0$ field in three substantially orthogonal directions (X, Y, and Z). Gradient coils 128 may be configured to encode emitted MR signals by systematically varying the $B_0$ field (the $B_0$ field generated by the $B_0$ magnets 122 or shims 124) to encode the spatial location of received MR signals as a function of frequency or phase. In a non-limiting example, the gradient coils 128 may be configured to vary frequency or phase as a linear function of spatial location along a particular direction, although more complex spatial encoding profiles may also be provided by using nonlinear gradient coils. In some embodiments, the gradient coils 128 may be implemented using laminate panels (e.g., printed circuit boards), in a non-limiting example.

During FSE scans, the gradient coils 128 may be controlled to produce phase encoding gradients, which may be used to sample an MR signal at different positions along different directions (e.g., the X, Y, and Z orthogonal directions). The phase-encoding gradient is a magnetic field gradient that varies linearly along the phase-encoding direction, which causes a phase shift in the MR signal according to its position in that direction. The gradient coils 128 can be controlled (e.g., by the controller 106) to vary the amplitude of the phase-encoding gradient for each acquisition, causing different locations along the phase-encoding direction to be sampled. The MR signal can be spatially encoded in the phase-encoding direction. The number of phase encoding steps can influence the resolution of the MR image along the phase-encoding direction. For example, increasing the number of phase encoding steps may improve image resolution but also increases scan time, while decreasing the number of phase encoding steps may reduce image resolution and decreases scan time.

MRI scans are performed by exciting and detecting emitted MR signals using transmit and receive coils, respectively (referred to herein as radio frequency (RF) coils). The transmit and receive coils may include separate coils for transmitting and receiving, multiple coils for transmitting or receiving, or the same coils for transmitting and receiving. Thus, a transmit/receive component may include one or more coils for transmitting, one or more coils for receiving, or one or more coils for transmitting and receiving. The transmit/receive coils may be referred to as Tx/Rx or Tx/Rx coils to generically refer to the various configurations for transmit and receive magnetics components of an MRI system. These terms are used interchangeably herein. In FIG. 1, RF transmit and receive coils 126 may include one or more transmit coils that may be used to generate RF pulses to induce an oscillating magnetic field $B_1$. The transmit coil(s) may be configured to generate any type of suitable RF pulses.

The power management system 110 includes electronics to provide operating power to one or more components of the MRI system 100. In a non-limiting example, the power management system 110 may include one or more power supplies, energy storage devices, gradient power components, transmit coil components, or any other suitable power electronics needed to provide suitable operating power to energize and operate components of MRI system 100. As illustrated in FIG. 1, the power management system 110 may include a power supply system 112, power component(s) 114, transmit/receive circuitry 116, and may optionally include thermal management components 118 (e.g., cryogenic cooling equipment for superconducting magnets, water cooling equipment for electromagnets).

The power supply system 112 may include electronics that provide operating power to magnetic components 120 of the MRI system 100. The electronics of the power supply system 112 may provide, in a non-limiting example, operating power to one or more gradient coils (e.g., gradient coils 128) to generate one or more gradient magnetic fields to provide spatial encoding of the MR signals. Additionally, the electronics of the power supply system 112 may provide operating power to one or more RF coils (e.g., RF transmit and receive coils 126) to generate or receive one or more RF signals from the subject. In a non-limiting example, the power supply system 112 may include a power supply configured to provide power from mains electricity to the MRI system or an energy storage device. The power supply may, in some embodiments, be an AC-to-DC power supply that converts AC power from mains electricity into DC power for use by the MRI system. The energy storage device may, in some embodiments, be any one of a battery, a capacitor, an ultracapacitor, a flywheel, or any other suitable energy storage apparatus that may bi-directionally receive (e.g., store) power from mains electricity and supply power to the MRI system. Additionally, the power supply system 112 may include additional power electronics including, but not limited to, power converters, switches, buses, drivers, and any other suitable electronics for supplying the MRI system with power.

The amplifiers(s) 114 may include one or more RF receive (Rx) pre-amplifiers that amplify MR signals detected by one or more RF receive coils (e.g., coils 126), one or more RF transmit (Tx) power components configured to provide power to one or more RF transmit coils (e.g., coils 126), one or more gradient power components configured to provide power to one or more gradient coils (e.g., gradient coils 128), and may provide power to one or more shim power components configured to provide power to one or more shims (e.g., shims 124). In some implementations, the shims 124 may be implemented using permanent magnets, electromagnetics (e.g., a coil), or combinations thereof. The transmit/receive circuitry 116 may be used to select whether RF transmit coils or RF receive coils are being operated.

As illustrated in FIG. 1, the MRI system 100 may include the controller 106 (also referred to as a console), which may include control electronics to send instructions to and receive information from power management system 110. The controller 106 may be configured to implement one or more pulse sequences, which are used to determine the instructions sent to power management system 110 to operate the magnetic components 120 in a desired sequence (e.g., parameters for operating the RF transmit and receive coils 126, parameters for operating gradient coils 128, etc.). Additionally, the controller 106 may execute processes to estimate navigator maps for DWI reconstruction according to various techniques described herein. A pulse sequence may generally describe the order and timing in which the RF transmit and receive coils 126 and the gradient coils 128 operate to acquire resulting MR data. In a non-limiting example, a pulse sequence may indicate an order and duration of transmit pulses, gradient pulses, and acquisition times during which the receive coils acquire MR data.

A pulse sequence may be organized into a series of periods. In a non-limiting example, a pulse sequence may include a pre-programmed number of pulse repetition periods, and applying a pulse sequence may include operating the MRI system in accordance with parameters of the pulse sequence for the pre-programmed number of pulse repetition periods. In each period, the pulse sequence may include parameters for generating RF pulses (e.g., parameters identifying transmit duration, waveform, amplitude, phase, etc.), parameters for generating gradient fields (e.g., parameters identifying transmit duration, waveform, amplitude, phase, etc.), timing parameters governing when RF or gradient pulses are generated or when the receive coil(s) are configured to detect MR signals generated by the subject, among other functionality. In some embodiments, a pulse sequence may include parameters specifying one or more navigator RF pulses, as described herein.

Examples of pulse sequences include zero echo time (ZTE) pulse sequences, balance steady-state free precession (bSSFP) pulse sequences, gradient echo pulse sequences, inversion recovery pulse sequences, DWI pulse sequences, spin echo pulse sequences including conventional spin echo (CSE) pulse sequences, multi-shot FSE pulse sequences, turbo spin echo (TSE) pulse sequences or any multi-spin echo pulse sequences such a diffusion weighted spin echo pulse sequences, inversion recovery spin echo pulse sequences, arterial spin labeling pulse sequences, and Overhauser imaging pulse sequences, among others.

When capturing multi-shot FSE pulse sequences, the controller 106 can control the transit and receive coils 126 to generate a series of RF excitation pulses separated by intervals of time, during which the controller 106 controls the gradient coils 128 to apply phase-encoding gradients. The total number of phase-encoding steps may be divided into smaller shots, with each shot corresponding to a portion of the k-space. Each shot may be acquired with a separate RF excitation pulse, and the k-space data for each shot may be acquired and stored by the controller 106. The controller 106 can then combine the k-space data from all the shots to reconstruct the final image.

The controller 106 may initiate an example multi-shot FSE imaging process by first generating a strong magnetic field using the $B_0$ magnets 122. The strong magnetic field may align the hydrogen protons in the tissue. In some implementations, the $B_0$ magnets 122 can be permanent magnets that are always active. In some implementations, such as when the $B_0$ magnets 122 are electromagnets, the controller 106 may activate the $B_0$ magnets 122. The controller 106 can then initiate an RF pulse via transmit and receive coils 126 to excite the protons. The controller 106 can activate transmit and receive coils 126 to generate a series of RF refocusing pulses that are applied to the tissue, resulting multiple corresponding echoes. The phase of the RF pulses and the phase may be modified according to the techniques described herein.

After each excitation caused by the RF refocusing pulses, the controller 106 can utilize the gradient coils 128 to apply a phase-encoding gradient to the tissue being imaged. The phase of the phase-encoding gradient may be varied simultaneously with the varied phase of the RF excitation pulses. The controller 106 can vary the amplitude of the phase-encoding gradient for each excitation, allowing spatial information to be encoded along the phase-encoding direction. The controller 106 can then acquire the k-space data for each shot separately. As described herein, each shot can correspond to a portion of the k-space. The total number of shots depends on the number of phase-encoding steps utilized for the desired spatial resolution. The k-space data for the image can be stored in memory of the controller, and in some implementations, provided to the computing device 104.

The controller 106 can then perform an image reconstruction process using the k-space data to generate an image-domain image of the scanned tissue.

As illustrated in FIG. 1, the controller 106 may communicate with the computing device 104, which may be programmed to process received MR data. In a non-limiting example, the computing device 104 may process received MR data to generate one or more MR images using any suitable image reconstruction processes. Additionally or alternatively, the controller 106 may process received MR data to perform image reconstruction, and the reconstructed image may be provided to the computing device 104 for display. The controller 106 may provide information about one or more pulse sequences to computing device 104 for the processing of data by the computing device.

The computing device 104 may be any electronic device configured to process acquired MR data and generate one or more images of a subject being imaged. The computing device 104 may include at least one processor and a memory (e.g., a processing circuit). The memory may store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unity (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor may read instructions. The instructions may include code generated from any suitable computer programming language. The computing device 104 may include any or all of the components and perform any or all of the functions of the computer system 800 described in connection with FIG. 8. In some implementations, the computing device 104 may be located in a same room as the MRI system 100 or coupled to the MRI system 100 via wired or wireless connection.

In some implementations, computing device 104 may be a fixed electronic device such as a desktop computer, a server, a rack-mounted computer, or any other suitable fixed electronic device that may be configured to process MR data and generate one or more images from MR signals captured using the MRI system 100. Alternatively, computing device 104 may be a portable device such as a smart phone, a personal digital assistant, a laptop computer, a tablet computer, or any other portable device that may be configured to process MR signal data. In some implementations, computing device 104 may comprise multiple computing devices of any suitable type, as aspects of the disclosure provided herein are not limited in this respect. In some implementations, operations that are described as being performed by the computing device 104 may instead be performed by the controller 106, or vice-versa. In some implementations, certain operations may be performed by both the controller 106 and the computing device 104 via communications between said devices.

The MRI system 100 may include one or more external sensors 178. The one or more external sensors may assist in detecting one or more error sources (e.g., motion, noise) which degrade image quality. The controller 106 may be configured to receive information from the one or more external sensors 178. In some embodiments, the controller 106 of the MRI system 100 may be configured to control operations of the one or more external sensors 178, as well as collect information from the one or more external sensors 178. The data collected from the one or more external sensors 178 may be stored in a suitable computer memory and may be utilized to assist with various processing operations of the MRI system 100.

The MRI system 100 may be a portable MRI system, and therefore may include portable subsystems 150. The portable subsystems 150 may include at least one power subsystem 152 and at least one motorized transport system 154. The power subsystem 152 may include any device or system that enables or supports the portability of the MRI system 100. In a non-limiting example, the power subsystem 152 may include any of the functionality of the power supply 112, and may further include other circuitry enabling the provision of electric power, including but not limited to as batteries and associated circuitry, AC-DC converters, DC-DC converters, switching power converters, voltage regulators, or battery charging circuitry, among others. The power subsystem 152 may include connectors that support the portability of the MRI system 100, such as connectors and cables of a suitable size for a portable system. In some implementations, the power subsystem 152 may include circuitry that provides power to the MRI system 100. In some implementations, the power subsystem 152 may include circuitry or connectors that enable the MRI system 100 to receive power from one or more power outlets, which may include standard power outlets.

The motorized transport system 154 can include any device or system that allows the MRI system 100 to be transported to different locations. The motorized transport system 154 may include one or more components configured to facilitate movement of the MRI system 100 to a location at which MRI is needed. In some implementations, the motorized transport system 154 may include a motor coupled to drive wheels. In such implementations, the motorized transport system 154 may provide motorized assistance in transporting MRI system 100 to one or more locations. The motorized transport system 154 may include a plurality of castors to assist with support and stability as well as facilitating transport.

In some implementations, the motorized transport system 154 includes motorized assistance controlled using a controller (e.g., a joystick or other controller that can be manipulated by a person) to guide the portable MRI system during transportation to desired locations. The motorized transport system 154 may include power assist circuitry (e.g., including accelerometers and vibration sensors, etc.) that detects when force is applied to the MRI system and, in response, engages the motorized transport system 154 to provide motorized assistance in the direction of the detected force. In some implementations, the motorized transport system 154 can detect when force is applied to one or more portions of the MRI system 100 (e.g., by an operator pushing on or applying force to a rail, housing, etc., of the MRI system 100) and, in response, provide motorized assistance to drive the wheels in the direction of the applied force. The MRI system 100 can therefore be guided to locations where MRI is needed. The power subsystem 152 can be utilized to provide power to the MRI system 100, including the motorized transport system 154.

In some implementations, the motorized transport system 154 may include a safety mechanism that detects collisions. In a non-limiting example, the motorized transport system 154 can include one or more sensors that detect the force of contact with another object (e.g., a wall, bed or other structure). Upon detection of a collision, the motorized transport system 154 can generate a signal to one or more motors or actuators of the motorized transport system 154, to cause a motorized locomotion response away from the source of the collision. In some implementations, the MRI system 100 may be transported by having personnel move the system to desired locations using manual force. In such implementations, the motorized transport system 154 may include wheels, bearings, or other mechanical devices that enable the MRI system 100 to be repositioned using manual force.

As described herein, the controller 106 may include one or more processors and memory, and may include any or all of the components and perform any or all of the functions of the computer system 800 described in connection with FIG. 8. The controller 106 may control one or more of the components of the MRI system 100 to perform an FSE MRI scan. In addition to discussing the present techniques, theory relating to the process of performing multi-shot FSE is provided. Details relating to the phase of RF pulses utilized during the FSE imaging processes are described.

As described herein, multi-shot FSE imaging utilizes a number of RF pulses. In a non-limiting example NMR experiment with M RF pulses, the RF pulse phases may be represented as a vector $\phi=(\phi_1, \phi_2, \ldots \phi_M)$. The accumulated signal phase resulting from these RF phases is $\Delta P \cdot \phi$, where $\Delta P=(\Delta p_1, \Delta p_2 \ldots \Delta p_M)$ is the coherence transfer (CT) pathway difference vector, and $\Delta_{pj}=p_j-p_j-1$. The CT pathway difference vector may be derived from the CT pathway vector of M+1 elements, $p=(p_0, p_1 \ldots p_M)$, where $p_0=0$ and $p_M=-1$. Given the receiver phase, $\phi_{rsvr}$, the observed RF accumulated signal phase resulting from a single pathway, p, is represented in Equation 1 below.

$$\Phi=\Delta P \cdot \phi + \phi_{rsvr}. \tag{1}$$

The corresponding signal is represented in Equation 2 below.

$$S=S_0 \exp(i\Phi), \tag{2}$$

In Equation 2 above, $S_0$ is the inherent complex NMR signal. In some implementations, the RF pulses may excite a set of CT pathways, P, either inherently following the underlying spin physics or as a consequence of hardware imperfections. The net observed signal is the sum of the signal arising from individual pathways, $p_l \in P$, as represented in Equation 3 below.

$$S=S_0 \Sigma_l a_l e^{i(\Delta P_l \cdot \phi + \phi_{rsvr})}. \tag{3}$$

In Equation 3 above, $\Delta P_l$, $\alpha_l$ is the CT pathway difference vector and the corresponding complex amplitude associated with CT pathway $p_l$, and the index l runs over the pathways in P.

Amongst these pathways, some may be desired, D $\in$ P, while others may be undesired, U $\in$ P. The signal arising from the undesired pathways cause signal artifacts. Removing the signal arising from the undesired pathways reduce or eliminate the signal artifacts. One approach to removing the signal from the undesired pathways is to perform a "nested" phase cycling, in which multiple transients are acquired by cycling the pulse and receiver phase, as represented in Equation 4 below.

$$\frac{1}{N'}\sum_{k=1}^{N'} e^{i(\Delta P_l \cdot \phi_k + \phi_{rsvr_k})} = \begin{cases} 1 & \text{if } p_l \in D \\ 0 & \text{otherwise} \end{cases}, \tag{4}$$

In Equation 4 above, $\phi k$ and $\phi_{rsvr}k$ may be the RF pulse phase vector and receiver phase of the $k^{th}$ transient, and the index k runs over N' transients. The CT pathway set P depends on the number of RF pulses and is invariant of the transients. From Equation 4, the generic phase cycling equation for pathway selection can be represented in Equation 5 below.

$$\Delta P \cdot \phi = \phi_{rsvr}. \tag{5}$$

A substitution of the equation for pathway selection from Equation 5 in Equation 3 is represented in Equation 6 below.

$$S=S_0 \Sigma_l a_l e^{i\{(\Delta P_l - \Delta P) \cdot \phi\}}. \tag{6}$$

In Equation 6 above, the pathways for which the exponent is zero are selected. Since the exponent is a dot product, more than one CT pathways can be selected. Given (by design) $\phi=\alpha\phi_p$, where $\alpha=(\alpha_1, \alpha_2 \ldots a_m)$ is a vector of integers, Equation 6 re-expresses to Equation 7 below.

$$S=S_0 \Sigma_n b_n e^{in\phi_p}, \tag{7}$$

In Equation 7 above, $n=(\Delta P_l - \Delta P_0) \cdot \alpha$ is an integer. The summation in Equation 7 is expressed in terms of the exponent rather individual pathways. In this representation, the signal from all pathways with n=0 is selected, while the remaining are phase modulated.

When the controller 106 performs an echo train acquisition in an FSE imaging process, the observed accumulated NMR signal phase of an echo, resulting from the RF pulses, is described similar to the NMR signal phase after M pulses in Equation 7 above. In the echo train acquisition, every subsequent echo encounters at-least one more RF pulse than the preceding echo. Every echo therefore has its own set of CT pathways, RF pulse phase vector, and receiver phase. The observed signal of the $m^{th}$ echo follows in Equation 8 below.

$$E_m = E^{(m)} \sum_n b_n^{(m)} e^{in\phi_p}, \tag{8}$$

In Equation 8 above, $E^{(m)}$ is the inherent complex NMR signal of the $m^{th}$ echo.

Referring now to the operations relating to suppressing image artifacts in multi-shot MR images, the controller 106 may perform multi-shot FSE sequences to generate MR image data. When describing the functionality of the controller 106, reference may be made to any of FIGS. 2A, 2B, and 3.

Referring to FIG. 2A in the context of the components described in connection with FIG. 1, depicted is an example graph 200A showing RF pulses, gradient phase encoding, and echo readouts during a multi-shot FSE sequence implemented by the controller 106. For visual clarity, reference numbers are assigned to the patterns in the legend below the graph, each of which corresponds to a respective operation. The controller 106 can initiate a sequence of echoes by transmitting an initial RF pulse 225 having a phase $\phi_{p1}$. The graph 200A shows an example echo train that begins a segment and includes M echoes.

A preparation block 205 follows the initial RF pulse 225 having the phase $\phi_{p1}$. During the preparation block, the controller 106 may provide an initial set of RF and gradient pulses (e.g., the first phase encoding 210, the second phase encoding 215, followed by an example readout 220) that are applied at the beginning of each repetition time (TR) in the pulse sequence. The preparation block 205 can prepare the longitudinal magnetization of tissues for the subsequent FSE echo train. The preparation block 205 may be generic and may be used for diffusion, T1, or T2 weighting. As shown, the initial RF pulse 225 has a phase $\phi_{p1}$, which can remain constant throughout the segment to which the echo train corresponds. Across $n_1$ segments, the controller 106 can cycle the phase $\phi_{p1}$ cycles from 0 to $2\pi$ according to a predetermined increment value.

In a non-limiting example, eight segments may be utilized. In this non-limiting example, the phase, $\phi_{p1}$ for the initial excitation RF pulse 225 may have eight phase steps, as shown below.

$$\phi_{p1} = \left[\frac{\pi}{2}, -\frac{\pi}{2}, 0, \pi, \frac{\pi}{4}, -\frac{3\pi}{4}, \frac{\pi}{4}, \frac{3\pi}{4}\right]$$

It should be understood that any suitable number of excitation phase steps may be utilized to achieve useful results. In a non-limiting example, the number of excitation phase steps may be any predetermined integer, such as an integer in the range of 2 to 16 excitation phase steps. In some implementations, the number of excitation phase steps may be any number in a range of 2 to a number of pulse trains in the sequence divided by two. As described herein, the controller 106 can cause the phase $\phi_{p1}$ of the excitation RF pulse 225 for each segment to cycle from 0 to $2\pi$ across $n_1$ segments using the transmit and receive coils 126.

Following the initial excitation RF pulse 225 and the preparation block 205, the controller can emit sequence of RF refocusing pulses 230A-230K (sometimes generally referred to as "RF refocusing pulse(s) 230") using the transmit and receive coils 126 to generate the echo train for the FSE procedure. As shown, the phase of each RF refocusing pulse 230 within the echo train is set according to a quadratic phase pulse an additional phase $\phi_{p2}$ value, defined as $(M-1)^2\phi_0+\phi_{p1}$. In a non-limiting example, the phase $\phi 0$ can be defined as $\phi_0=322\pi/843$, and M can be the echo index, as shown. In some implementations, the phase $\phi 0$ may be constant/zero across all N echo trains.

The controller 106 can sample a three-dimensional k-space signal, $S(\vec{k})$, using N echo trains, where each train consists of M echoes. In some implementations, a single shot of the multi-shot FSE imaging process is an echo-train with M echoes. The controller 106 can sample each dimension of the k-space data resulting from the echoes of the RF refocusing pulses 230. The controller 106 can sample one dimension of the k-space data through direct detection in the presence of a readout gradient 220, established using the gradient coils 128, in a non-limiting example. The readout gradient 220 can be applied by the controller 106 at the end of each pulse sequence, as shown, to encode the spatial location of the magnetization and generate the final image. By varying the amplitude of the readout gradient, the precession frequency of the protons in the tissue can be made to vary linearly with position along the gradient direction. This allows the FSE pulse sequence to encode the position of the magnetization and generate a k-space spatial map of the signal.

The controller 106 may indirectly sample the remaining two k-space dimensions using the first phase encoding gradient 210 and the second phase encoding gradient 215, as shown. A single echo-train samples M, while the entire scan samples M*N points over the two indirect k-space. Each echo-train samples M points of the phase encoding plain. In this non-limiting example, the net encoding gradient moment is zero between two refocusing pulses, as shown. The method can also be applied to sequences where the net encoding gradient moment is non zero.

To implement the artifact suppression techniques described herein, the controller 106 can utilize a phase-incremented (PI) quadratic scheme when transmitting the excitation RF pulses 225 and the RF refocusing pulses 230. As shown, in addition to the quadratic phase value $(m-1)^2\phi_0$, the controller 106 incorporates an additional phase value term $\phi_{p2}$ into the phase of the transmitted RF refocusing pulses 230, in addition to the additional phase value term $\phi_{p1}$ for the RF excitation pulse 230 for each echo train. As described herein, the phase $\phi_{p1}$ is constant for each segment (e.g., a pre-determined set of echo trains). The phase value $\phi_{p2}$ cycles from 0 to $2\pi$ across the echo train within the segment. In a non-limiting example, the number of incrementing phase steps of the phase value $\phi_{p2}$ may be any predetermined integer. In some implementations, the predetermined number of phase steps for the phase value $\phi_{p2}$ may range from two to the maximum number of shots in the FSE imaging process.

In a non-limiting example, the phase value $\phi_{p2}$ for the RF refocusing pulses may have sixteen phase steps, as shown below.

$$\phi_{p2} = \begin{bmatrix} \frac{\pi}{2}, & -\frac{\pi}{2}, & 0, & \pi, & \frac{\pi}{4}, & -\frac{3\pi}{4}, & -\frac{\pi}{4}, & \frac{3\pi}{4}, \\ \frac{3\pi}{8}, & -\frac{5\pi}{8}, & -\frac{\pi}{8}, & \frac{7\pi}{8}, & \frac{\pi}{8}, & -\frac{7\pi}{8}, & -\frac{3\pi}{8}, & \frac{5\pi}{8} \end{bmatrix}$$

Referring to FIG. 2B in the context of the components described in connection with FIG. 1, depicted is an example diagram showing how echo trains (e.g., shots) are divided into multiple segments during a multi-shot FSE imaging process implemented by the controller 106. When performing the FSE techniques described herein, the FSE sequence may include N echo trains, and the N echo trains may be split into roughly $n_1$ equal segments. Each segment can include N/n1 echo trains (e.g., such as example echo train shown in the graph 200A of FIG. 2A). As described herein, each echo train can include M echoes (e.g., and therefore M corresponding refocusing pulses). Over the duration of a given segment, the controller 106 may vary the phase value $\phi_{p2}$ according to a predetermined integer number of steps (e.g., from 0 to $2\pi$ across the segment). The controller 106 may cycle the phase value $\phi_{p1}$ from 0 to $2\pi$ across $n_1$ segments, while holding the phase value $\phi_{p1}$ for the RF excitation pulse (e.g., the RF excitation pulses 225 for each echo train in the segment) constant during any given segment.

Figure 3:
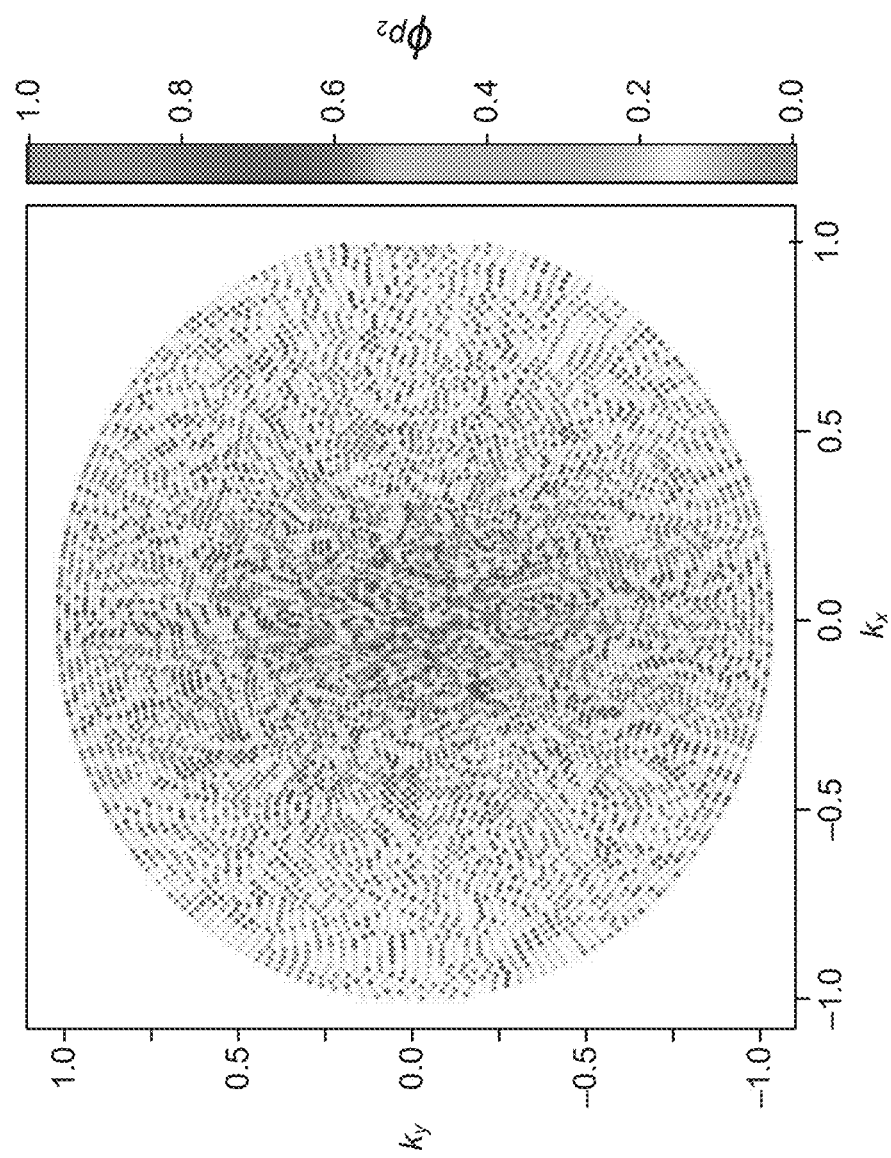
FIG. 3 depicts a plot of example k-space sampling as a function of the RF refocusing pulse phase $\phi_{p2}$, in accordance with one or more implementations.

Referring to FIG. 3 in the context of the components described in connection with FIG. 1, depicted is a plot 300 of example k-space sampling as a function of the RF refocusing pulse phase $\phi_{p2}$, in accordance with one or more implementations. In this example representation, each point is an echo, and the color represents the pulse phase, $\phi_{p2}$, of the echo-train during which the echo was acquired. The normalized phase value $\phi_{p2}$ is shown as ranging from 0 to 1, representing phase variation from -pi to pi.

The phase-incremented approaches described herein can be utilized to suppress artifacts that appear in alternative approaches, such as the quadratic approach (e.g., utilizing only the quadratic phase value, defined as $(m-1)^2\phi_0$). The various example experimental results show the reduction or elimination of a variety of different artifacts.

Figure 4A:
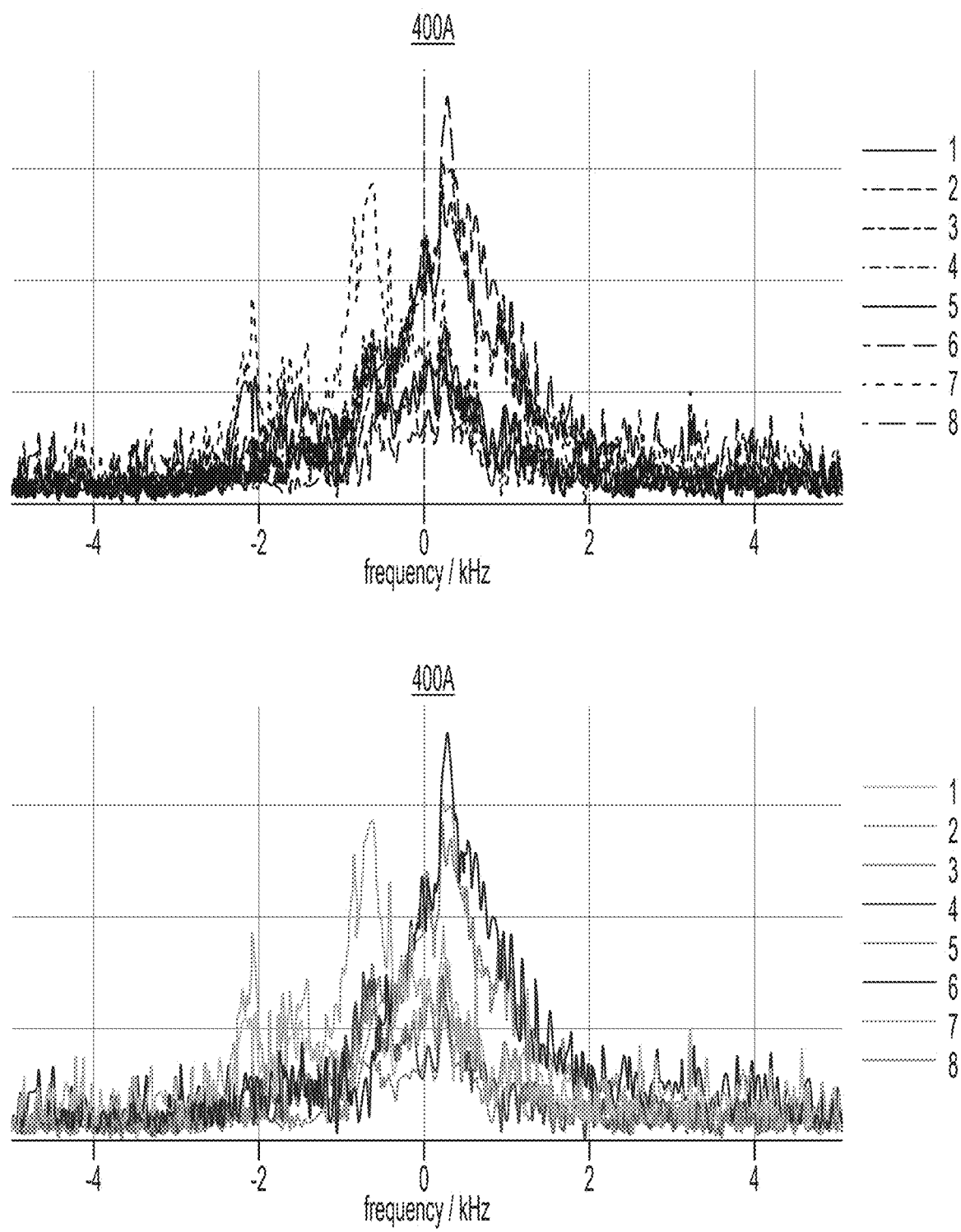
FIGS. 4A and 4B depict the extent of the $B_0$ homogeneity and a comparison of diffusion-weight image (DWI) acquired in the respective $B_0$ homogeneity in which the quadratic phase scheme generates phase distorted image artifacts from $B_0$ inhomogeneity, whereas phase-incremented (PI)-quadratic suppressed the $B_0$ inhomogeneity artifact, in accordance with one or more implementations.
Figure 4B:
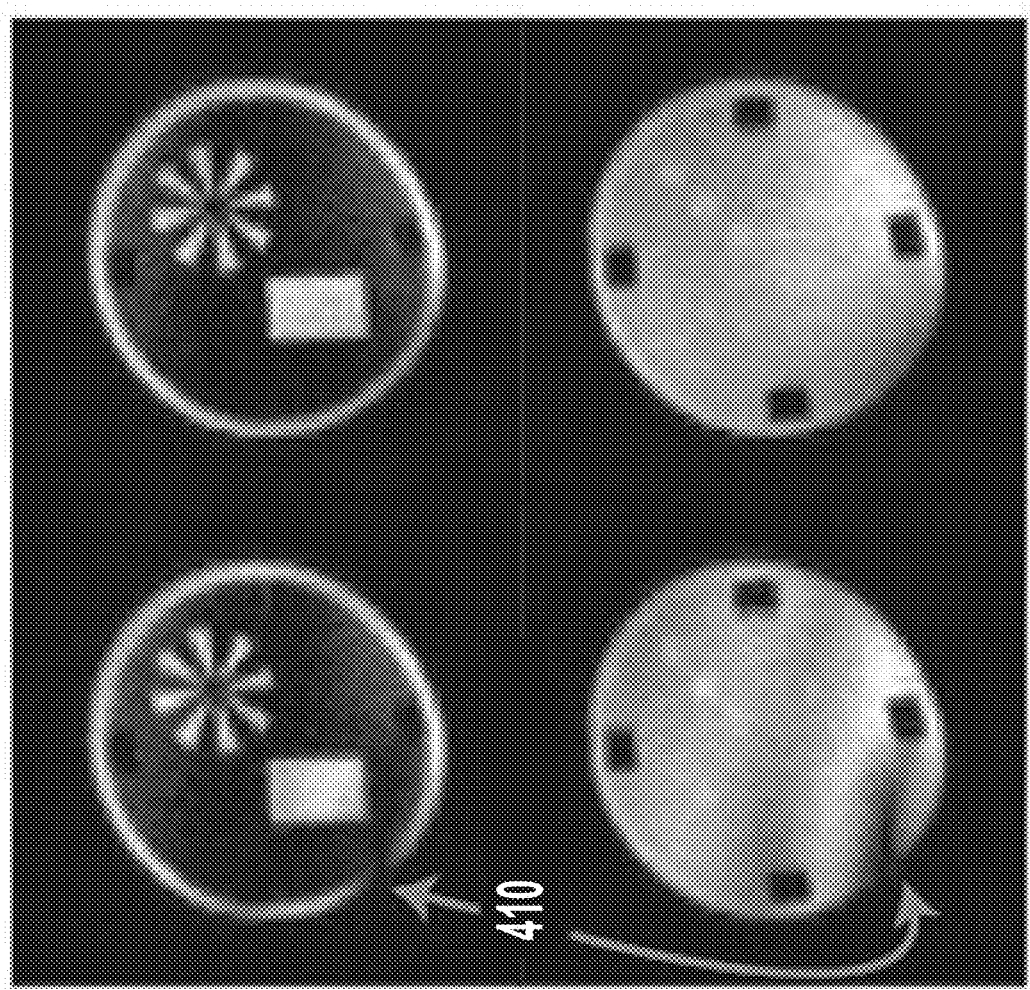

Referring to FIGS. 4A and 4B, depicted is the extent of the $B_0$ homogeneity and a DWI acquired in the respective $B_0$ homogeneity, respectively. As illustrated in the graph 400A of FIG. 4A, there is significant $B_0$ inhomogeneity, which may cause various phase artifacts in reconstructed images. The data for the comparison image 400B of FIG. 4B was captured in the $B_0$ field reflected in the graph 400A of FIG. 4A. The comparison image 400B shows diffusion-weighted FSE images acquired with the quadratic phase approach (left-hand side) and using the techniques described herein (right-hand side, sometimes referred to herein as the PI quadratic phase cycling approach. In the comparison image 400B of FIG. 4B, the top and bottom left-hand images correspond to images captured using a quadratic phase approach, which include the artifacts 410. In this non-limiting example, the artifacts 410 cause information in the image to fail to appear; in the top-left image, a portion of the ring does not appear, and in the bottom-left image, a portion of the circle includes banding that obscures image quality. In contrast, using the PI quadratic phase techniques described herein shown in the top and bottom right-hand images do not include the artifacts 410.

Figure 4C:
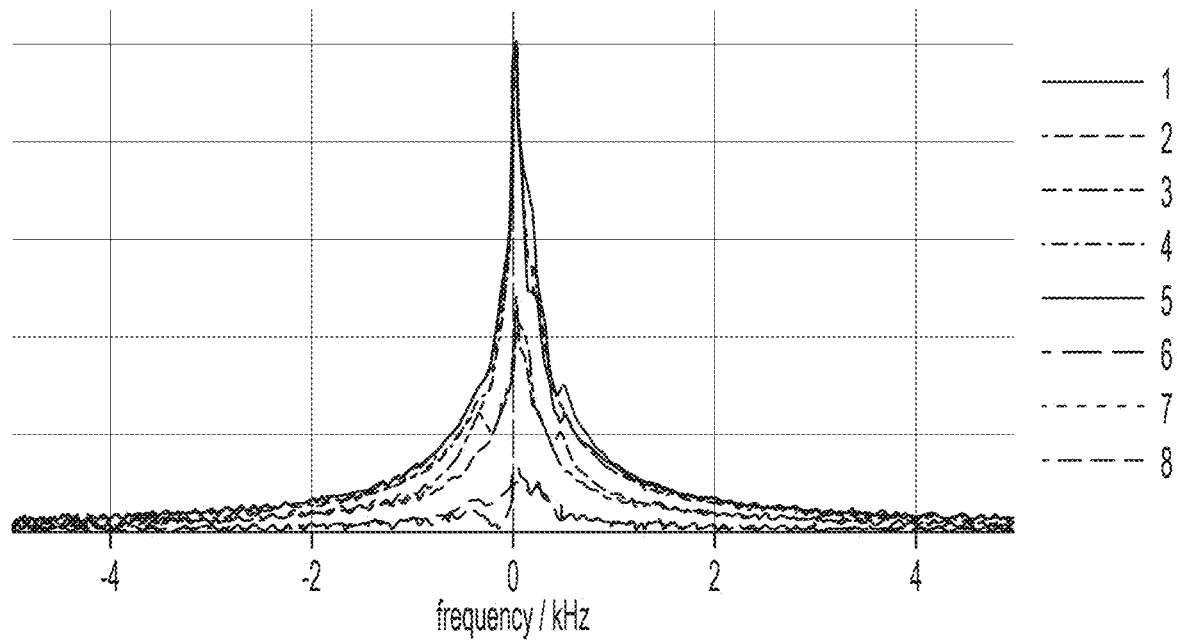
FIGS. 4C and 4D show the extent of the $B_0$ homogeneity and a comparison of quadratic v.s. PI-quadratic phase schemes on a DWI acquired in the respective $B_0$ homogeneity at less severe $B_0$ inhomogeneity, in accordance with one or more implementations.
Figure 4C:
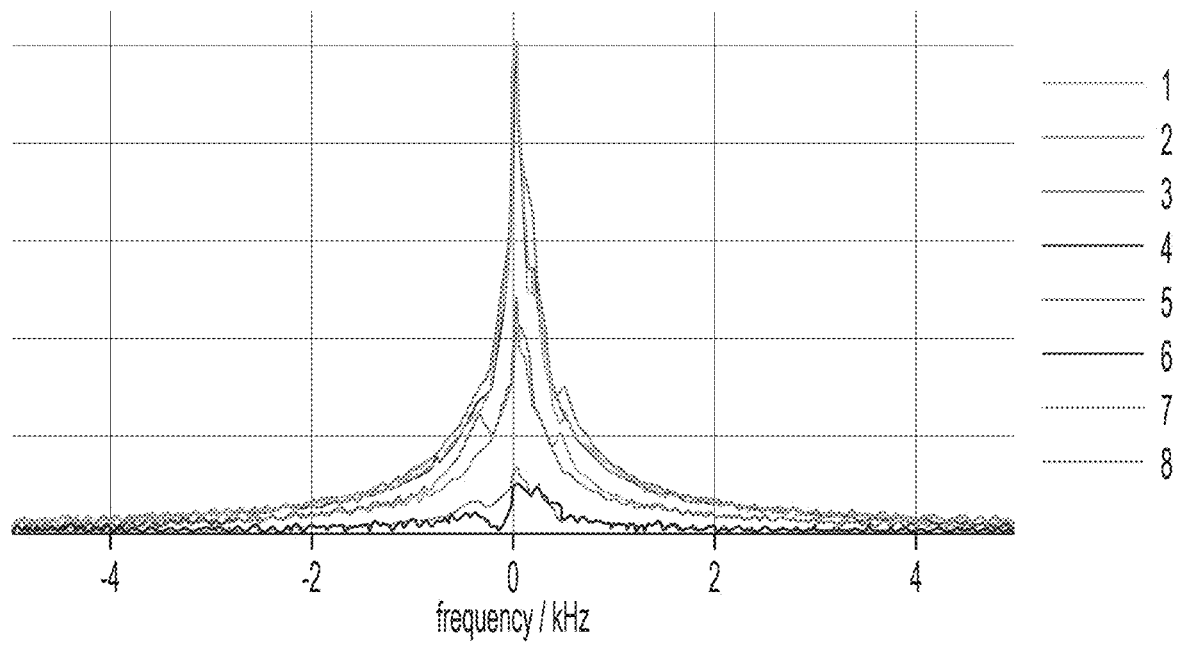
Figure 4D:
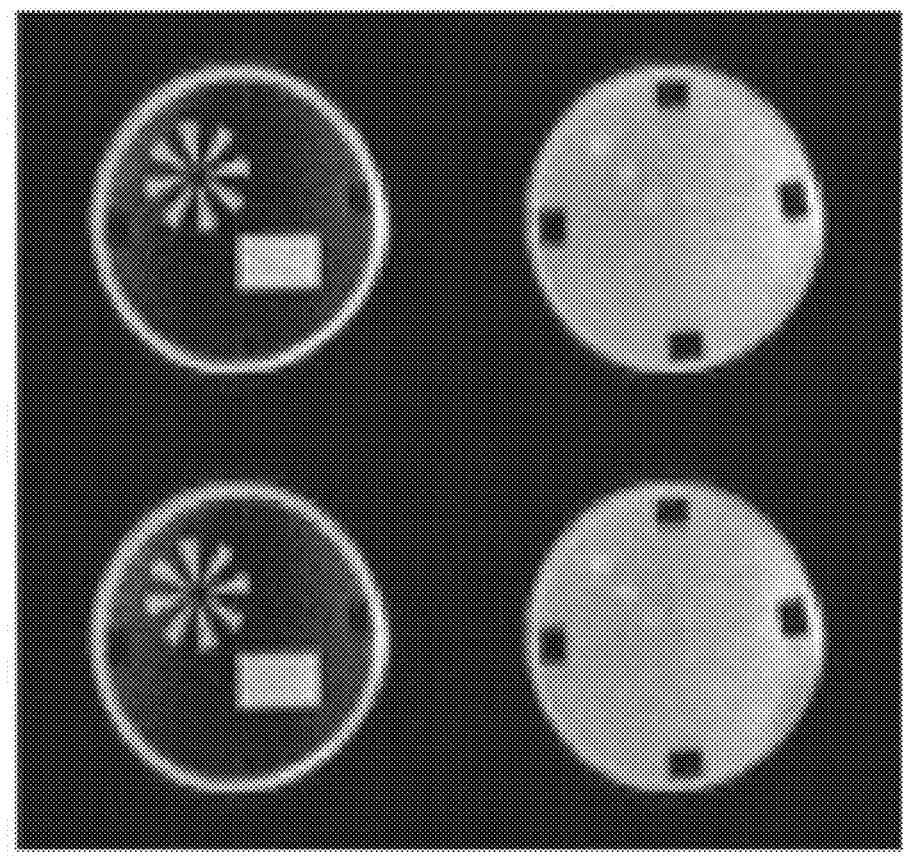

Referring to FIGS. 4C and 4D, depicted are is extent of the $B_0$ homogeneity and a DWI acquired in the respective $B_0$ homogeneity at less inhomogeneous $B_0$, in accordance with one or more implementations. As shown in FIG. 4C, there is not significant $B_0$ inhomogeneity, and therefore it is less likely that artifacts will occur due to magnetic field inhomogeneity during an FSE imaging process. This is reflected in the comparison image 400D of FIG. 4D, which indicates that, at uniform $B_0$, there is no difference between the quadratic (e.g., not using the phase-incrementing techniques described herein) and PI-quadratic phase (e.g., utilizing the phase-incrementing techniques described herein) approaches.

Figure 5B:
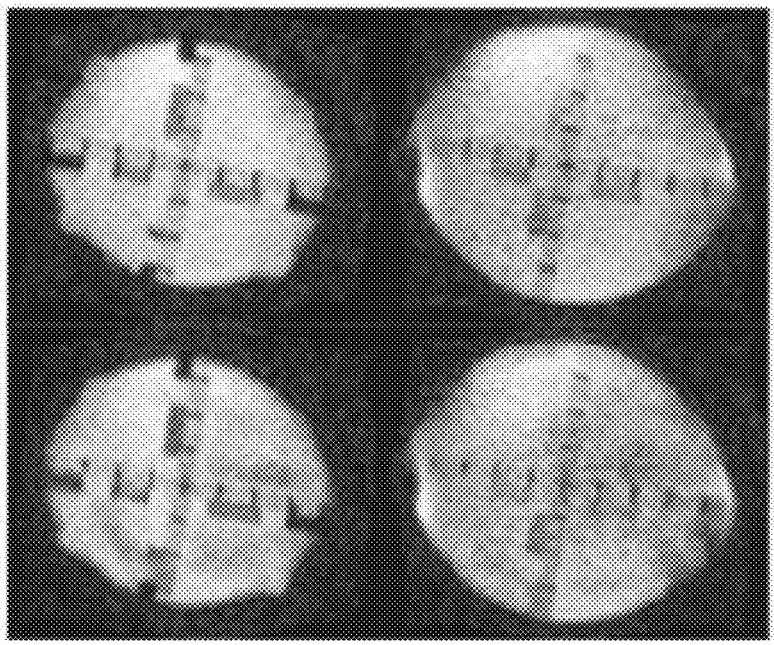
FIGS. 5A and 5B show a comparison of quadratic (left column) versus PI-quadratic (right column) phase techniques in the presence of eddy-current artifacts for a DWI sequence, in accordance with one or more implementations.
Figure 5A:
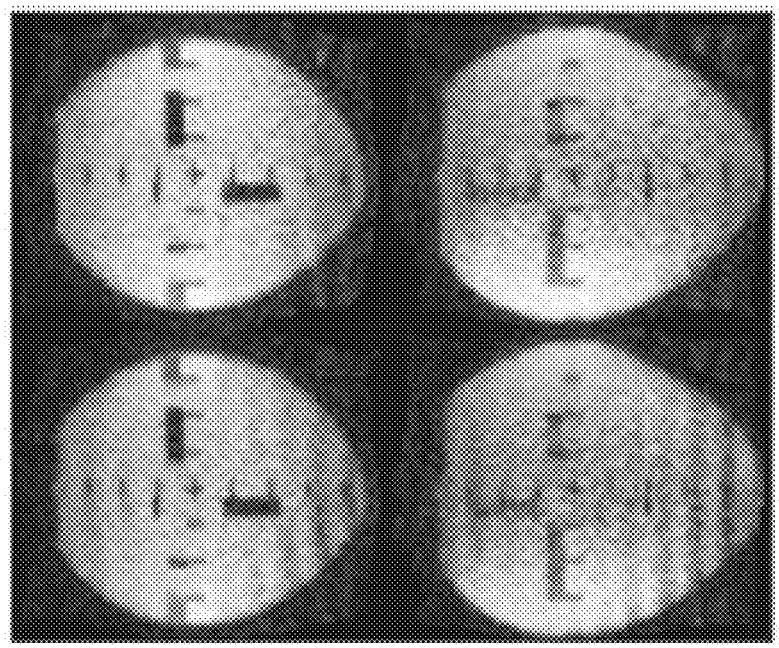

The techniques described herein may be utilized to suppress eddy current artifacts, as described in connection with FIGS. 5A and 5B. Referring to FIGS. 5A and 5B, depicted are comparison images 500A and 500B showing a quadratic phase approach (e.g., not implementing the techniques described herein) compared to a PI-quadratic phase approach (e.g., utilizing the techniques described herein) for the suppression of eddy-current artifacts occurring in a DWI sequence, in accordance with one or more implementations. In FIGS. 5A and 5B, the diffusion-weighted FSE comparison images 500A and 500B were acquired with using the quadratic phase approach (on the left-hand side of each image 500A and 500B) and the proposed PI quadratic phase cycling approach (e.g., the techniques described herein, shown on the right-hand side of each image 500A and 500B) in the presence of eddy currents.

In both the comparison images 500A and 500B, the PI-quadratic captures shown on the right-hand side are shown as efficiently suppressing the banding artifacts from residual eddy currents, which appear on the left-hand side of each image 500A and 500B due to the partial eddy current compensation. In the comparison images 500A and 500B, the eddy currents generate banding artifacts along the z-direction for images captured using the quadratic phase approach on the left-hand side, which is suppressed in the images captured using the techniques described herein, as shown in the right-hand side of each image 500A and 500B.

The techniques described herein may be utilized to suppress FID artifacts and ghosting artifacts, as described in connection with FIGS. 6A, 6B, 6C, and 6D. Referring to FIGS. 6A, 6B, 6C, and 6D, depicted are comparison images 600A, 600B, 600C, and 600D showing images captured using the quadratic phase approach compared to using the techniques described herein. The comparison images 600A, 600B, 600C, and 600D compare the presence of FID and ghosting artifacts in $T_2$ weighted FSE sequences.

The FID and spin-echo time-origins may be separated by half the acquisition time. In a non-limiting example of signal processing, the time corresponding to the spin-echo top may be referenced as the origin. In this reference frame, the FID signal has a temporal shift. Following the shift-phase Fourier relationship, a Fourier transformation of a temporal shift FID signal results in a first-order (linear) phase-modulated image that appears as ripple artifacts. Since the FID is always detected along the readout direction, these first-order ripple artifacts are along the readout direction. In the image 600A of FIG. 6A, which is captured using a quadratic phase approach (e.g., not utilizing the techniques described herein) the FID ripple artifact 605 is seen towards the bottom edge of the image along the read-out direction. In the image 600B of FIG. 6B, the image captured using the PI-quadratic phase techniques described herein suppresses these artifacts, as shown in the corresponding region 610.

Figure 6A:
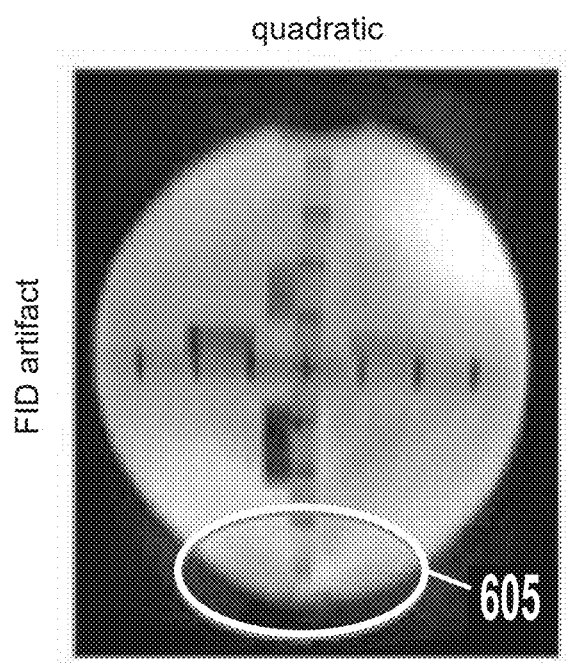
FIGS. 6A, 6B, 6C, and 6D shows comparison images of a quadratic phase approach to FSE imaging versus the techniques described herein, which compare the presence of free induction decay (FID) and ghosting artifacts in $T_2$ weighted FSE sequences, in accordance with one or more implementations.
Figure 6B:
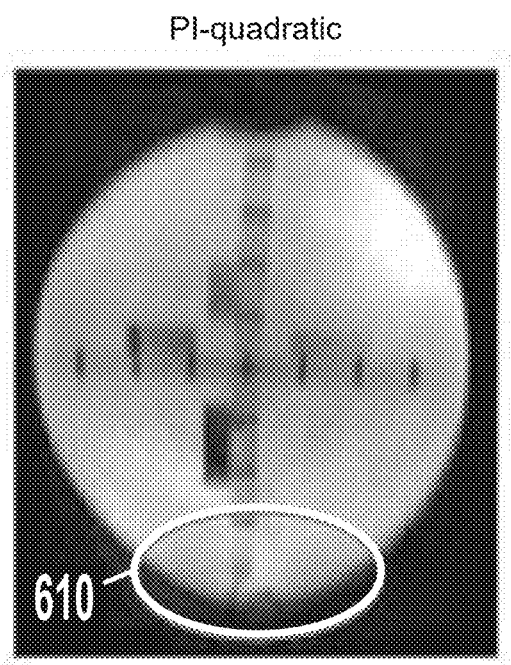
Figure 6C:
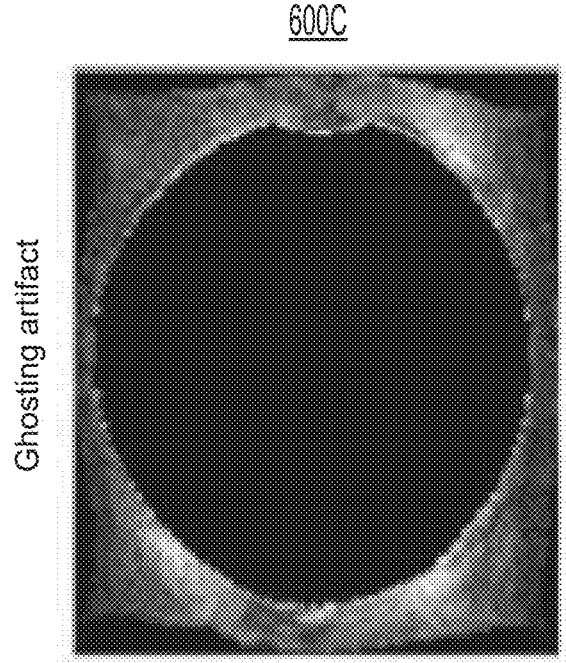
Figure 6D:
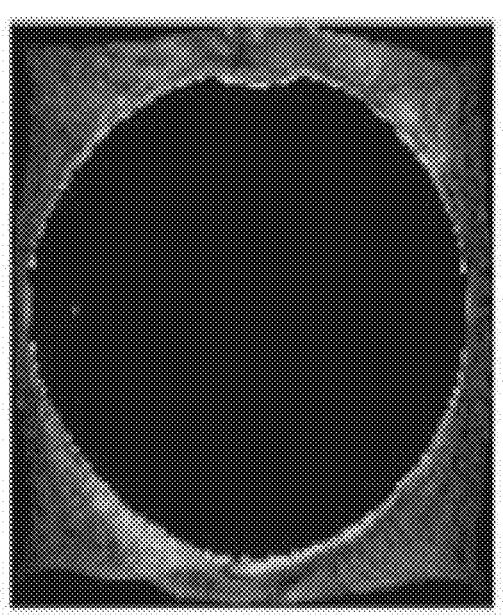

FIGS. 6C and 6D show images 600C and 600D, which are the same images as the corresponding images 600A and 600B in FIGS. 6A and 6B, respectively, except with a mask applied around the phantom region of each image 600C and 600D. Both images 600C and 600D in FIGS. 6C and 6D are scaled identically to accentuate the background. In the image 600C of FIG. 6C, the ghosting artifact is seen in the background towards the periphery of the image 600C. In the image 600D of FIG. 6D, the PI-quadratic techniques described herein suppresses ghosting artifacts.

Figure 7:
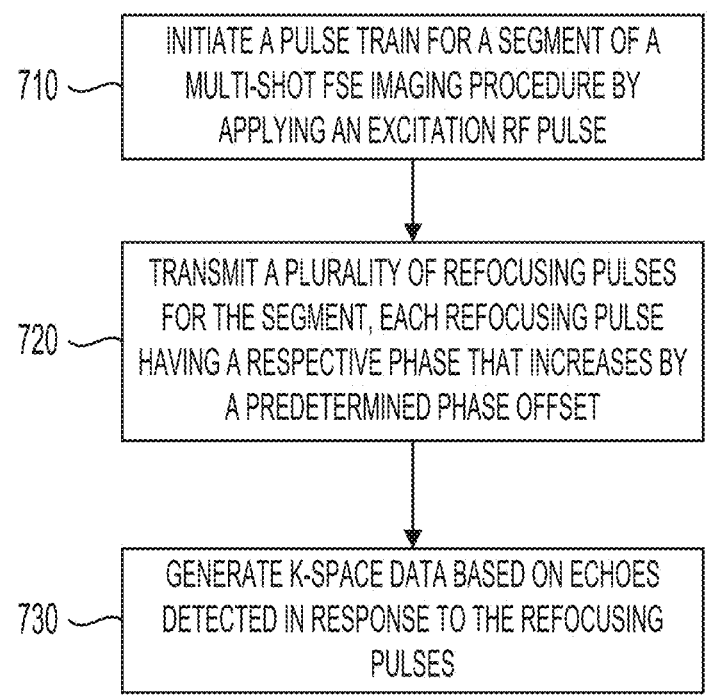
FIG. 7 depicts a flowchart of an example method of suppressing artifacts multi-shot FSE imaging, in accordance with one or more implementations.

Referring to FIG. 7, depicted is a flowchart of an example method 700 of suppressing artifacts multi-shot FSE imaging, in accordance with one or more implementations. The method 700 may be executed using any suitable computing system (e.g., the controller 106, the computing device 104 of FIG. 1, the computing system 800 of FIG. 8, etc.) of an MR system (e.g., the MRI system 100). The MR system used to perform the method 700 may have a magnetic field inhomogeneity of less than or equal to 1000 parts-per-million. The MR system used to perform the method 700 may have a a magnetic resonance frequency inhomogeneity greater than 1000 Hz. It may be appreciated that certain steps of the method 700 may be executed in parallel (e.g., concurrently) or sequentially, while still achieving useful results. The method 700 may be executed to generate k-space data using an FSE imaging process, as described herein.

The method 700 may include act 710, in which the MR system initiates a pulse train for a segment of a multi-shot fast spin-echo imaging procedure by applying an excitation RF pulse (e.g., the RF excitation pulse 225 of FIG. 2, etc.). As described in connection with FIGS. 1 and 2A, the MR system can initiate a sequence of echoes (e.g., caused by a pulse train) by transmitting an initial RF excitation pulse having a phase $\phi_{p1}$. The phase value $\phi_{p1}$ may remain constant throughout the segment to which the echo train corresponds. Across $n_1$ segments, the MR system cycles the phase $\phi_{p1}$ cycles from 0 to $2\pi$ according to a predetermined increment value, as described herein. The cycled phase value for the RF excitation pulses cause, in part, the suppression of imaging artifacts described herein. A preparation block may follow the RF excitation pulse having the phase $\phi_{p1}$. During the preparation block, the MR system may provide an initial set of RF and gradient pulses, as described herein. The preparation block can prepare the longitudinal magnetization of tissues for the subsequent FSE echo train. The preparation block may be generic and may be used for diffusion, T1, or T2 weighting.

The method 700 may include act 720, in which the MR system transmits RF refocusing pulses for the segment, each refocusing pulse of the RF refocusing pulses having a respective phase that increases by a predetermined phase offset with each successive refocusing pulse of the segment. The RF refocusing pulses may be transmitted using RF coils of the MR system (e.g., the transit and receive coils 126). The RF refocusing pulses may be transmitted following the preparation block. Each RF refocusing pulse transmission may be followed by phase-encoding gradients via gradient coils (e.g., the gradient coils 128) as described herein. The phase of each RF refocusing pulse within the echo train is set according to a quadratic phase value, defined as $(M-1)^2\phi_0 + \phi_{p2}$. In a non-limiting example, the phase $\phi_0$ can be defined as $\phi_0 = 322\pi/843$, and M can be the echo index. In some implementations, the phase $\phi_0$ may be constant/zero across all N echo trains.

To implement the artifact suppression techniques described herein, the controller 106 can utilize PI quadratic scheme when transmitting the RF refocusing pulses. In addition to the quadratic phase value $(m-1)^2\phi_0$, the MR system incorporates an additional phase value term $\phi_{p2}$ into the phase of RF refocusing pulses. The phase value $\phi_{p2}$ cycles from 0 to $2\pi$ across the echo train of a shot, according to a predetermined number of steps. In some implementations, the phase value $\phi_{p2}$ cycles from 0 to $2\pi$ across the echo trains of a segment, according to a predetermined number of steps. In either case, the phase value $\phi_{p2}$ may be equal for at least two RF refocusing pulses, depending on the number of RF refocusing pulses in the echo train or in the segment. In a non-limiting example, the number of incrementing phase steps of the phase value $\phi_{p2}$ may be any predetermined integer. In some implementations, the predetermined number of phase steps for the phase value $\phi_{p2}$ may range from 2 to the maximum number of shots in the FSE imaging process. In a non-limiting example, the number of the RF refocusing pulses transmitted by the MR system can range from two to a number of pulse trains in the sequence divided by two.

The method 700 may include act 730, in which the MR system generates k-space data based on a respective plurality of echoes detected by the MR system in response to the RF refocusing pulses. As described herein, a single shot of the multi-shot FSE imaging process is an echo-train with M echoes, which may be transmitted in act 720. The MR system can sample each dimension of the k-space data resulting from the echoes of the RF refocusing pulses. The MR system can sample one dimension of the k-space data through direct detection in the presence of a readout gradient, established using gradient coils (e.g., the gradient coils 128), in a non-limiting example. The readout gradient can be applied by the MR system at the end of each pulse sequence to encode the spatial location of the magnetization and generate the final image. By varying the amplitude of the readout gradient, the precession frequency of the protons in the tissue can be made to vary linearly with position along the gradient direction. This allows the FSE pulse sequence to encode the position of the magnetization and generate a k-space spatial map of the signal. The MR system may indirectly sample the remaining two k-space dimensions using the multiple phase encoding gradients, as described in connection with FIGS. 1 and 2A.

Once an echo train of a segment has been completed, the MR system can initiate further echo trains until k-space data has been captured for N echo trains (e.g., where N is the predetermined number of shots in the multi-shot FSE imaging process). A single echo-train samples M k-space points, while the M*N points over the two indirect k-space. For each of the N shots, the MR system can initiate a corresponding pulse train by applying a corresponding excitation RF pulse having a phase offset. If the corresponding shot begins a new segment, as described herein, the phase offset may be equal to the first initial phase offset of the excitation RF pulse transmitted in act 710 plus a predetermined phase increment. The predetermined phase increment may be about equal to $2\pi$ divided by a number of shots to be captured for the multi-shot fast spin-echo imaging procedure. If the corresponding shot is part of the same segment as the first excitation pulse transmitted in act 710, the excitation pulse may have the same phase offset as the first excitation pulse transmitted in act 710. The MR system may utilize the k-space data captured during each shot to generate an image-domain image, using a suitable image reconstruction technique. The image-domain image may be presented on a display of a computing device (e.g., the computing device 104), stored in memory, or provided to another computing system for processing, among other operations.

Figure 8:
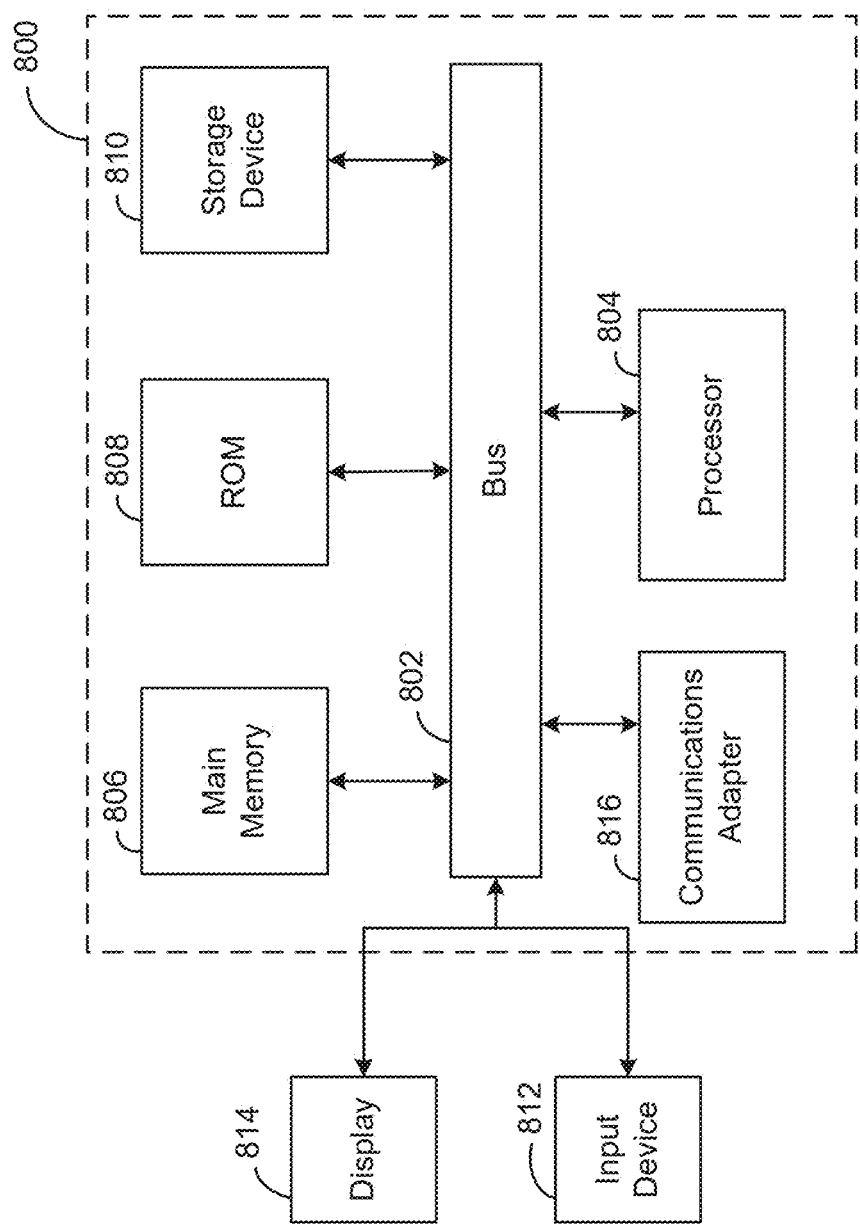
FIG. 8 is a block diagram of an example computing system suitable for use in the various arrangements described herein, in accordance with one or more example implementations.

FIG. 8 illustrates a component diagram of an example computing system suitable for use in the various implementations described herein, according to an example implementation. In a non-limiting example, the computing system 800 may implement a computing device 104 or controller 106 of FIG. 1, or various other example systems and devices described in the present disclosure.

The computing system 800 includes a bus 802 or other communication component for communicating information and a processor 804 coupled to the bus 802 for processing information. The computing system 800 also includes main memory 806, such as a RAM or other dynamic storage device, coupled to the bus 802 for storing information, and instructions to be executed by the processor 804. Main memory 806 may also be used for storing position information, temporary variables, or other intermediate information during execution of instructions by the processor 804. The computing system 800 may further include a ROM 808 or other static storage device coupled to the bus 802 for storing static information and instructions for the processor 804. A storage device 810, such as a solid-state device, magnetic disk, or optical disk, is coupled to the bus 802 for persistently storing information and instructions.

The computing system 800 may be coupled via the bus 802 to a display 814, such as a liquid crystal display, or active matrix display, for displaying information to a user. An input device 812, such as a keyboard including alphanumeric and other keys, may be coupled to the bus 802 for communicating information, and command selections to the processor 804. In another implementation, the input device 812 has a touch screen display. The input device 812 may include any type of biometric sensor, or a cursor control, such as a mouse, a trackball, or cursor direction keys, for communicating direction information and command selections to the processor 804 and for controlling cursor movement on the display 814.

In some implementations, the computing system 800 may include a communications adapter 816, such as a networking adapter. Communications adapter 816 may be coupled to bus 802 and may be configured to enable communications with a computing or communications network or other computing systems. In various illustrative implementations, any type of networking configuration may be achieved using communications adapter 816, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein may be achieved by the computing system 800 in response to the processor 804 executing an implementation of instructions contained in main memory 806. Such instructions may be read into main memory 806 from another computer-readable medium, such as the storage device 810. Execution of the implementation of instructions contained in main memory 806 causes the computing system 800 to perform the illustrative processes described herein. One or more processors in a multi-processing implementation may also be employed to execute the instructions contained in main memory 806. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. Describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. In a non-limiting example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, in a non-limiting example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, in a non-limiting example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. In a non-limiting example, two or more steps may be performed concurrently or with partial concurrence.

Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A method of suppressing image artifacts in multi-shot magnetic resonance (MR) images, comprising:
   initiating, by an MR system comprising one or more processors, a pulse train for a segment of a multi-shot fast spin-echo imaging procedure by applying an excitation radio frequency (RF) pulse;
   transmitting, by the MR system, a plurality of RF refocusing pulses for the segment, each refocusing pulse of the plurality of RF refocusing pulses having a respective phase that increases by a predetermined phase offset with each successive refocusing pulse of the segment; and
   generating, by the MR system, k-space data based on a respective plurality of echoes detected by the MR system in response to the plurality of RF refocusing pulses.

2. The method of claim 1, further comprising initiating, by the MR system, a second pulse train for a second segment of the multi-shot fast spin-echo imaging procedure by applying a second excitation RF pulse having a second initial phase offset, the second initial phase offset equal to a first initial phase offset of the excitation RF pulse plus a predetermined phase increment.

3. The method of claim 2, wherein the predetermined phase increment is about equal to $2\pi$ divided by a number of shots to be captured for the multi-shot fast spin-echo imaging procedure.

4. The method of claim 3, wherein a number of RF excitation pulse phase steps ranges from two to a number of pulse trains in the sequence divided by two.

5. The method of claim 1, generating the k-space data comprises applying, by the MR system, a readout gradient following a respective refocusing pulse of the plurality of RF refocusing pulses.

6. The method of claim 5, wherein the k-space data is three-dimensional (3D) k-space data, a respective readout resulting from the respective refocusing pulse corresponds to a first dimension, and the method further comprises applying, by the MR system, at least two phase-encoding gradients respectively corresponding to second and third dimensions.

7. The method of claim 1, wherein the MR system has a magnetic resonance frequency inhomogeneity greater than 1000 Hz.

8. A system for suppressing image artifacts in multi-shot magnetic resonance (MR) images, comprising an MR system comprising one or more processors, the MR system configured to:
    initiate a pulse train for a segment of a multi-shot fast spin-echo imaging procedure by applying an excitation radio frequency (RF) pulse;
    transmit a plurality of RF refocusing pulses for the segment, each refocusing pulse of the plurality of RF refocusing pulses having a respective phase that increases by a predetermined phase offset with each successive refocusing pulse of the segment; and
    generate k-space data based on a respective plurality of echoes detected by the MR system in response to the plurality of RF refocusing pulses.

9. The system of claim 8, wherein the MR system is further configured to initiate a second pulse train for a second segment of the multi-shot fast spin-echo imaging procedure by applying a second excitation RF pulse having a second initial phase offset, the second initial phase offset equal to a first initial phase offset of the excitation RF pulse plus a predetermined phase increment.

10. The system of claim 9, wherein the predetermined phase increment is about equal to $2\pi$ divided by a number of shots to be captured for the multi-shot fast spin-echo imaging procedure.

11. The system of claim 10, wherein a number of the plurality of RF refocusing pulses ranges from two to a number of pulse trains in the sequence divided by two.

12. The system of claim 8, wherein the MR system is further configured to generate the k-space data by performing operations comprising applying a readout gradient following a respective refocusing pulse of the plurality of RF refocusing pulses.

13. The system of claim 12, wherein the k-space data is three-dimensional (3D) k-space data, a respective readout resulting from the respective refocusing pulse corresponds to a first dimension, and the MR system is further configured to apply at least two phase-encoding gradients respectively corresponding to second and third dimensions.

14. The system of claim 8, wherein the MR system has a magnetic resonance frequency inhomogeneity greater than 1000 Hz.

15. A method of producing radio frequency pulses to reduce artifacts in a multi-shot fast spin-echo (FSE) imaging procedure, comprising transmitting, for each segment of the multi-shot FSE imaging procedure, a plurality of refocusing pulses each with a respective phase that increases by a predetermined phase offset with each successive refocusing pulse.

* * * * *